United States Patent [19]

Smith et al.

[11] 3,850,758

[45] Nov. 26, 1974

[54] PURIFICATION OF CRUDE MALEIC ANHYDRIDE BY TREATMENT WITH DIMETHYLBENZOPHENONE

[75] Inventors: Addison M. Smith, Buffalo; Eugene B. Recla, Hamburg, both of N.Y.

[73] Assignee: Allied Chemical Corporation, New York, N.Y.

[22] Filed: July 2, 1973

[21] Appl. No.: 376,099

[52] U.S. Cl............... 203/38, 203/62, 260/346.8 M
[51] Int. Cl.......................... B01d 3/34, C07c 57/14
[58] Field of Search.......... 260/346.8 M; 203/38, 62

[56] References Cited
UNITED STATES PATENTS 2,959,600  11/1960  Houben...................... 260/346.8 M
3,135,669  6/1964  Taggart...................... 260/346.8 M
3,476,775  11/1969  Sueur.......................... 260/346.8 M

FOREIGN PATENTS OR APPLICATIONS 1,317,308  1/1963  France....................... 260/348.6 M Primary Examiner—Wilbur L. Bascomb, Jr.
Attorney, Agent, or Firm—Anthony J. Stewart; Jay P. Friedenson

[57] ABSTRACT

Crude maleic anhydride is purified by heating a solution of crude maleic anhydride in dimethylbenzophenone for at least fifteen minutes, at total reflux at a temperature above about 230°C, and thereafter recovering maleic anhydride, e.g., by distillation.

4 Claims, No Drawings

3,850,758

PURIFICATION OF CRUDE MALEIC ANHYDRIDE BY TREATMENT WITH DIMETHYLBENZOPHENONE

BACKGROUND OF THE INVENTION

The production of maleic anhydride is generally accomplished by the gas phase oxidation of organic compounds, e.g., benzene, butene or butane, with oxygen in the presence of a catalyst. The maleic anhydride produced is recovered by partial condensation or absorption using such solvents as water or organic compounds. The crude maleic anhydride isolated by these processes then requires purification in order that it be commercially acceptable. Heretofore, the purification of crude maleic anhydride recovered by partial condensation or solvent absorption involved a dehydration step which generally was accomplished by the addition of a substance to the crude maleic anhydride. The most successful and widely employed method for the purification of maleic anhydride has involved the use of $P_2O_5$. The $P_2O_5$ is added to the crude maleic anhydride and the mixture is distilled to recover the maleic anhydride product. $P_2O_5$ not only removes water but also acts to remove low boiling impurities and other compounds which would adversely affect the purity, and especially the color, of the maleic anhydride. These compounds are generally removed as tars in a residue which is formed during the distillation step in which the maleic anhydride is recovered. This residue is discarded, usually to a sewer. In view of the fact that significant quantities of phosphoric acid are formed during the distillation, this residue causes a considerable pollution problem. While a great deal of effort has been expended in attempts to reduce or eliminate the pollution caused by the phosphoric acid effluent, a large number of commercial maleic anhydride processes employ $P_2O_5$ in this manner.

SUMMARY OF THE INVENTION

In accordance with this invention there is provided a process for purifying crude maleic anhydride which comprises the absorption of maleic anhydride in the organic solvent, dimethylbenzophenone, and heating the solution to total reflux at a temperature of at least about 230°C for at least 15 minutes, preferably at least 1 hour, and thereafter recovering the maleic anhydride by separating the product from the solvent. Preferably the separation is accomplished by distillation. It has been found, unexpectedly, that the treatment of the crude maleic anhydride in such a manner results in a high quality maleic anhydride which has excellent color stability. Further advantages include the elimination of the pollution problem inherent in the use of $P_2O_5$ and the fact that the entire maleic anhydride recovery process can be made continuous by employing dimethylbenzophenone as the recovery solvent for maleic anhydride produced by the gas phase oxidation of organic compounds and employing the same dimethylbenzophenone in the purification process.

DETAILED DESCRIPTION OF THE INVENTION

The quality of maleic anhydride is recognized to be measurable by its color stability on aging, i.e., the less the color change the greater the purity of the maleic anhydride. A standard method for measuring the color of maleic anhydride is called the "platinum-cobalt color test," or the Hazen color test (ASTM D-1209). For most uses, particularly for catalytic reductions, the purity of maleic anhydride must be high grade. Generally, color, i.e., the purity, of commercial maleic anhydride must have a platinum-cobalt color of 25 units or less.

In the process of this invention, crude maleic anhydride is absorbed in dimethylbenzophenone and the solution is brought to total reflux at a temperature of at least 230°C, at atmospheric pressure. The solution is held at reflux for at least fifteen minutes, and preferably for one hour. Upon completion of the refluxing, the maleic anhydride is removed, e.g., by distillation and exhibits very good purity as measured by the platinum-cobalt test. Atmospheric reflux reboiler temperatures less than 230°C have been attempted. However, at these lower temperatures maleic anhydride so treated and recovered is not of sufficient purity to be of commercial value.

The term "total reflux" used herein denotes the boiling of the solution at a temperature which results in the formation of a vapor composed of two or more components of the solution, specifically, dimethylbenzophenone and maleic anhydride, and the return of all condensables back to the solution. When refluxing a solution of maleic anhydride in dimethylbenzophenone, the temperature of the condenser should be sufficiently low to condense the maleic anhydride but high enough to prevent solidification. Generally, it is preferred to use 58°C water as the condenser coolant.

According to the process of this invention, the solution of maleic anhydride in dimethylbenzophenone is heated to total reflux at a temperature of at least 230°C. Of course, it will be recognized that the concentration of maleic anhydride in the dimethylbenzophenone will affect the boiling point of the solution, and, to this end, the amount of maleic anhydride should always be regulated so as to allow a boiling temperature of at least 230°C, preferably 235°C, at atmospheric pressure. Temperatures as high as 250°C, at atmospheric pressure, can be used depending on the make-up of the solution, and even higher temperatures will serve to purify the maleic anhydride. However, since refluxing at temperatures higher than 250°C at atmospheric pressure require that the solution contain relatively small amounts of maleic anhydride, the use of such higher temperatures are not commercially atttactive. The most preferred total reflux temperature for the process of this invention is 235° – 237°C. While it is preferred to operate at atmospheric pressure, it will be understood that employing higher pressures will allow a greater concentration of maleic anhydride in the dimethylbenzophenone.

As stated above, the maleic anhydride is preferably recovered from the dimethylbenzophenone solution by distillation. Product separation by distillation is easily accomplished by means known to those in the art. Usually the pressure of the solution is reduced and the mixture is reheated with the result being that the maleic anhydride is taken off overhead. The maleic anhydride so recovered is then subjected to the platinum-cobalt color test and the value is noted. Thereafter, the maleic anhydride is subjected to rapid heat aging, i.e., heated to a temperature of about 140°C, and the color again tested. This rapid heat aging is a measure of the color stability of the maleic anhydride.

DESCRIPTION OF THE PREFERRED EMBODIMENTS

The following examples are given by way of illustration only and are not to be considered limiting in any manner.

EXAMPLE 1

A solution of 324 grams of crude maleic anhydride dissolved in 1,486 grams of dimethylbenzophenone was charged to a 3 liter still pot. The still pot was attached to a 1 inch × 3 foot column packed with Penn State Protruded Packing. A tempered water condenser and a flowspliter were then mounted on the top of the column. After the still pot and column were purged with nitrogen, the solution was heated to 195° – 200°C and held for four hours. For approximately 15 minutes, the still pot overheated to the atmospheric total reflux temperature of 236°C in the reboiler. After 4 hours of heat aging, the temperature was reduced to 151°C and the pressure reduced to 150 mmHg. The solution of maleic anhydride and dimethylbenzophenone was reheated to 175°C for 30 minutes. The product collected overhead at a 10:1 reflux ratio was white. The reflux ratio was changed to 1:1 and 287.2 grams of maleic anhydride was removed. The set point of the maleic anhydride recovered was determined to be 52.8°C. The platinum-cobalt color before heat aging was 12. After rapid heat aging at 140°C for 3 hours, the platinum-cobalt color was 15.

EXAMPLE 2

A solution of 3,000 grams of dimethylbenzophenone containing 700 grams of crude maleic anhydride was heated to atmospheric total reflux with a reboiler temperature of 235°–237°C and held for 45 minutes. After cooling, the material was transferred to a batch still equipped with a 1 inch × 10 tray Oldershaw column, a tempered water condenser and a flowsplitter. At a pressure of 100 mmHg and a reflux ratio of 10:1, 28.5 grams of lites were removed overhead. The lites free maleic anhydride-dimethylbenzophenone solution was transferred to a 1 inch × 15 tray Oldershaw equipped similar to that above. Operating at a head pressure of 58 mmHg and a 2:1 reflux ratio, 627.5 grams of product maleic anhydride were removed overhead. The distillation was discontinued when the reboiler temperature reached 200°C. The setting point of the product maleic anhydride was determined to be 52.8°C. The initial platinum-cobalt color was 7. After 3 hours aging at 140°C, the platinum-cobalt color was 18.

EXAMPLE 3

The purpose of this example is to show that operating at reboiler temperatures below 230°C results in maleic anhydride product which is not satisfactory for commercial useage.

The procedure set out in Example 2 was repeated with the exception that 1,000 grams of crude maleic anhydride was dissolved in 3,000 grams of dimethylbenzophenone instead of the 700 grams employed in Example 2. The reboiler temperature dropped to 223° – 224°C during heat aging at atmospheric total reflux. The time on total reflux was 20 minutes. The product maleic anhydride was 861 grams having a setting point of 52.8°C. The initial platinum-cobalt color was 8. After rapid heat aging for 3 hours at 140°C the platinum-cobalt color was greater than 70.

We claim:

1. A process for purifying crude maleic anhydride which comprises heating a solution of crude maleic anhydride in dimethylbenzophenone at total reflux at a temperature of at least 230°C, for at least 15 minutes and thereafter separating the maleic anhydride from the dimethylbenzophenone by distillation.

2. A process as described in claim 1 wherein the heating is continued for at least about 1 hour.

3. A process as described in claim 1 wherein the solution of maleic anhydride in dimethylbenzophenone is heated to at least about 235°C for at least 1 hour.

4. A process as described in claim 1 wherein the temperature at total reflux is between 230°C and 250°C.

* * * * *

UNITED STATES PATENT OFFICE
CERTIFICATE OF CORRECTION

Patent No. 3,850,758      Dated November 26, 1974

Inventor(s) ADDISON M. SMITH and EUGENE B. RECLA

It is certified that error appears in the above-identified patent and that said Letters Patent are hereby corrected as shown below:

Claim 3, Col. 4, line 39 - "at least 1 hour" should read -- at least about 1 hour --.

Signed and sealed this 11th day of February 1975.

(SEAL)
Attest:

RUTH C. MASON
Attesting Officer

C. MARSHALL DANN
Commissioner of Patents
and Trademarks